United States Patent
Wiesenberg

(10) Patent No.: US 11,399,270 B2
(45) Date of Patent: Jul. 26, 2022

(54) EMERGENCY IDENTIFICATION BASED ON COMMUNICATIONS AND RELIABILITY WEIGHTINGS ASSOCIATED WITH MOBILITY-AS-A-SERVICE DEVICES AND INTERNET-OF-THINGS DEVICES

(71) Applicant: Toyota Motor Engineering & Manufacturing North America, Inc, Plano, TX (US)

(72) Inventor: Ryan M. Wiesenberg, Ann Arbor, MI (US)

(73) Assignee: TOYOTA MOTOR ENGINEERING & MANUFACTURING NORTH AMERICA INC., Plano, TX (US)

( * ) Notice: Subject to any disclaimer, the term of this patent is extended or adjusted under 35 U.S.C. 154(b) by 0 days.

(21) Appl. No.: 16/829,781

(22) Filed: Mar. 25, 2020

(65) Prior Publication Data
US 2021/0306835 A1    Sep. 30, 2021

(51) Int. Cl.
| | |
|---|---|
| *H04M 11/04* | (2006.01) |
| *H04W 4/90* | (2018.01) |
| *H04W 4/70* | (2018.01) |
| *H04W 24/10* | (2009.01) |
| *H04W 8/14* | (2009.01) |
| *H04W 4/50* | (2018.01) |

(52) U.S. Cl.
CPC .............. *H04W 4/90* (2018.02); *H04W 4/50* (2018.02); *H04W 4/70* (2018.02); *H04W 8/14* (2013.01); *H04W 24/10* (2013.01)

(58) Field of Classification Search
CPC ......... H04W 4/90; H04W 4/46; H04W 4/021; H04W 76/50
See application file for complete search history.

(56) References Cited

U.S. PATENT DOCUMENTS

| | | | |
|---|---|---|---|
| 6,084,510 A | 7/2000 | Lemelson et al. | |
| 9,285,504 B2 | 3/2016 | Dannevik et al. | |
| 10,097,293 B2 | 10/2018 | Sennett et al. | |
| 10,366,597 B2 | 7/2019 | Shaw | |

(Continued)

FOREIGN PATENT DOCUMENTS

| | | |
|---|---|---|
| CN | 103886403 A | 6/2014 |
| CN | 106781446 A | 5/2017 |

(Continued)

OTHER PUBLICATIONS

O'Neill, Sean, "A Machine Learning Revolution in Disaster Response," www.turing.ac.uk/research/impact-stories/machine-learning-revolution-disaster-response, retrieved Apr. 1, 2020, 10 pages.

(Continued)

*Primary Examiner* — Khalid W Shaheed
(74) *Attorney, Agent, or Firm* — Jordan IP Law, LLC

(57) ABSTRACT

Apparatuses, systems, and methods relate to technology to identify first performance metrics associated with a first plurality of remote devices, determine first reliability weightings based on the first performance metrics, and identify one or more characteristics of an emergency based on the first reliability weightings and data from a first plurality of communications, where the first plurality of communications are associated with the first plurality of remote devices.

14 Claims, 9 Drawing Sheets

(56) References Cited

U.S. PATENT DOCUMENTS

| | | | |
|---|---|---|---|
| 2008/0066980 | A1 | 3/2008 | James |
| 2013/0332474 | A1 | 12/2013 | Glaubmaun et al. |
| 2014/0338644 | A1* | 11/2014 | MacNeille .............. F02D 21/08 701/115 |
| 2016/0036899 | A1 | 2/2016 | Moody et al. |
| 2016/0343093 | A1 | 11/2016 | Riland et al. |
| 2017/0161614 | A1 | 6/2017 | Mehta et al. |
| 2017/0180963 | A1* | 6/2017 | Cavendish ............ H04W 4/025 |
| 2017/0238129 | A1 | 8/2017 | Maier et al. |
| 2018/0053401 | A1 | 2/2018 | Martin et al. |
| 2018/0060281 | A1* | 3/2018 | Horovitz ............. G06F 11/3409 |
| 2018/0376305 | A1* | 12/2018 | Ramalho De Oliveira ................. G08G 1/096775 |
| 2019/0228596 | A1* | 7/2019 | Mondello ............... H04L 12/40 |
| 2020/0274962 | A1* | 8/2020 | Martin .................... H04W 4/90 |

FOREIGN PATENT DOCUMENTS

| | | |
|---|---|---|
| WO | 2014205497 A9 | 12/2014 |
| WO | 2019195630 A1 | 10/2019 |

OTHER PUBLICATIONS

Yu et al., "Big Data in Natural Disaster Management: A Review," MDPI, Geosciences Journal 2018, 8, 165, May 5, 2018, 26 pages.

IBM, "Utility Outage Prediction 2.0 Embracing Advanced Analytics & Machine Learning Solutions," www.ibm.com/downloads/cas/VO6DNBR3, 2018, 8 pages.

ITU, "Disruptive Technologies and Their Use in Disaster Risk Reduction and Management," www.itu.int/en/ITU-D/Emergency-Telecommunications/Pages/Events/2019/GET-2019/Disruptive-technologies-and-their-use-in-disaster-risk-reduction-and-management.aspx, retrieved Apr. 1, 2020, 2 pages.

Nguyen et al., "Coordinating Disaster Emergency Response with Heuristic Reinforcement Learning," Nov. 12, 2018, 10 pages.

Bert, Alison, "New in Disaster Science: Using Machine Learning and Maps to See Who's Vulnerable," www.elsevier.com/connect/new-in-disaster-science-using-machine-learning-and-maps-to-see-whos-vulnerable, Mar. 1, 2018, 10 pages.

Electric Insurance Company, "Natural Distaster and Catastrophe Planning," www.eic.electricinsurance.com/resources/natural-disaster-and-catastrophe-planning, retrieved Apr. 1, 2020, 4 pages.

Gangu, Prashanth, "We Need to Approach AI Risk Like We Do Natural Disasters," https://hbr.org/2018/02/we-need-to-approach-ai-risks-like-we-do-natural-disasters, Feb. 7, 2018, 6 pages.

Yudkowsky et al., "Reducing Long-Term Catastrophic Risks for Artificial Intelligence," Machine Intelligence Research Institute, 2010, 9 pages.

Rolnick et al., "Tackling Climate Change with Machine Learning," Nov. 5, 2019, 111 pages.

Minav et al., "Direct Driven Hydraulic Drive for New Powertrain Topologies for Non-Road Mobile Machinery," Electric Power Systems Research 152, Aug. 10, 2017, pp. 390-400.

* cited by examiner

EMERGENCY IDENTIFICATION BASED ON COMMUNICATIONS AND RELIABILITY WEIGHTINGS ASSOCIATED WITH MOBILITY-AS-A-SERVICE DEVICES AND INTERNET-OF-THINGS DEVICES

TECHNICAL FIELD

Embodiments generally relate to the leveraging of various data sources to analyze, track and predict emergency events and responses. The data sources may include a variety of sources ranging from remote devices (e.g., mobility-as-a-service (MaaS) devices and internet-of-things (IoT) devices), websites and applications that interface with third-party data.

BACKGROUND

As emergency circumstances arise (e.g., excessive snow, flood, fires, hurricanes, tornadoes, earthquakes, etc.), resources of responsive organizations (e.g., governments, non-governmental organizations (NGOs), etc.) may become overwhelmed. In some cases, entities may be able to aid in the response to the emergency. For example, nearby governmental organizations and/or private entities may be available to assist in the response and provide additional resources. The extent of a response (e.g., a number of necessary resources) may be difficult to forecast and may result in incomplete responses that leave the entities under-utilized while failing to mitigate the emergency circumstances.

BRIEF SUMMARY

Some embodiments may include a system including a network interface that receives a first plurality of communications associated with a first plurality of remote devices, and a control sub-system including at least one processor and at least one memory having a set of instructions, which when executed by the at least one processor, cause the control sub-system to identify first performance metrics associated with the first plurality of remote devices, determine first reliability weightings based on the first performance metrics, and identify one or more characteristics of an emergency based on the first reliability weightings and data from the first plurality of communications.

Some embodiments may include at least one computer readable storage medium comprising a set of instructions, which when executed by a computing platform, cause the computing platform to identify first performance metrics associated with a first plurality of remote devices, determine first reliability weightings based on the first performance metrics, and identify one or more characteristics of an emergency based on the first reliability weightings and data from a first plurality of communications, wherein the first plurality of communications is associated with the first plurality of remote devices.

Some embodiments may include a method comprising identifying first performance metrics associated with a first plurality of remote devices, determining first reliability weightings based on the first performance metrics, and identifying one or more characteristics of an emergency based on the first reliability weightings and data from a first plurality of communications, wherein the first plurality of communications is associated with the first plurality of remote devices.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
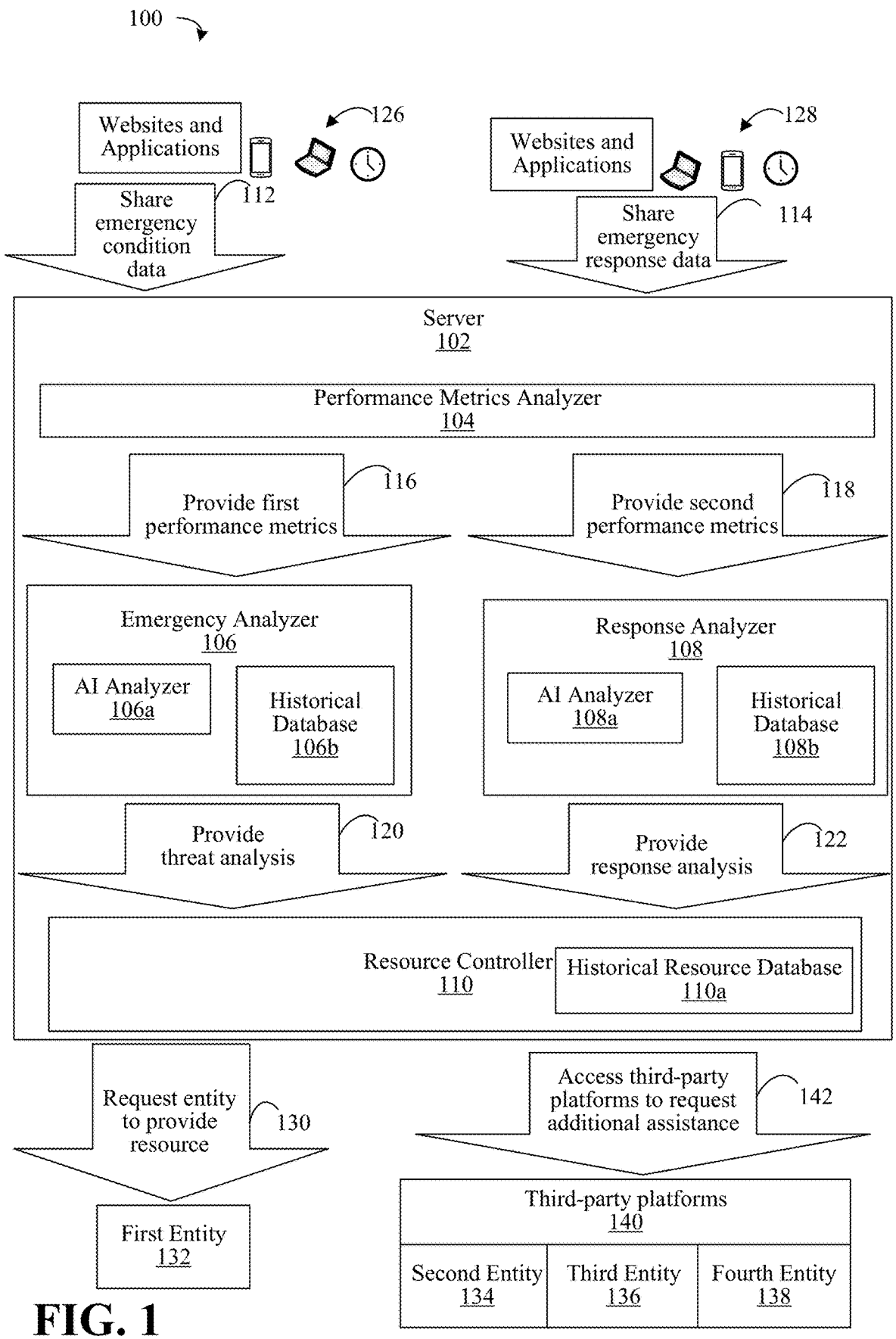
FIG. 1 is a diagram of an example of an emergency and response tracking scenario according to an embodiment.

Turning now to FIG. 1, a system 100 to track a current emergency, predict emergency scenario evolutions, and provide for a dynamic allocation of resources from different entities (e.g., private and government sources) to enhance a response to the predicted emergency scenarios. The system 100 may include various cloud-based monitoring sub-systems, such as, for example, a computing device such as a server 102, one or more emergency data sources (e.g., MaaS devices, IoT devices, websites, applications, etc.) 126 and as one or more response data sources (e.g., MaaS devices, IoT devices, websites, applications, etc.) 128 to monitor conditions of a current emergency and monitor a current emergency response. As will be explained in further detail hereinbelow, the server 102 may weigh data associated with the current emergency and current emergency response to enhance accuracy of identification of characteristics of the emergency and the current emergency response. While server 102 is illustrated, it will be understood that other types of computing devices may operate similarly as to described herein.

Furthermore, the server 102 may generate predictive models of the current emergency and resource allocations to mitigate the emergency. The resource allocations may be based not only on current conditions of the emergency, but also the predictive models to enhance resource allocations. For example, resources may be secured and distributed in advance of a need for the resources.

The server 102 may therefore accurately and efficiently identify resource to mitigate an emergency at a future time as well as obtain and position the resources prior to the resources being needed. The server 102 may enhance computer processing and resource management as the server 102 may generate decisions based on an array of historical emergency databases, records and at a level of detail that is far more granular than other implementations and relative to what is humanly possible. Moreover, the server 102 may be more efficient in identifying key information that is accurate to determine how to properly address the emergency, thereby reducing computing resources and monitoring resources.

For example, in some embodiments, as an emergency develops, emergency data sources 126 may communicate with server 102 to share emergency condition data 112 through various mediums (e.g., internet, Bluetooth, etc.). The emergency condition data may be associated with a current emergency and include data associated with the current emergency. For example, the emergency condition data may include sensor data (e.g., temperature, pressure, vibrational, global-positioning satellite, readings, anemometer readings, heatmaps that track fire, electrical usage maps, etc.), predictions (e.g., temperature will increase based on current trends, water fall will soon flood area, etc.) and/or other data that tracks the development of the current emergency. It will be understood that some embodiments may only receive emergency responses from one or more of the emergency data sources 126.

Further, in some embodiments, as an emergency develops, response data sources 128 may communicate with server 102 to share emergency response data 114 through various mediums (e.g., internet, Bluetooth, etc.). The emergency response data may be associated with the current emergency and include response data associated with the current emergency. For example, the emergency response data may include first responder information, resources (e.g., water, food, emergency personnel, etc.) that are already in place and/or active, suggestions of location of resources that may mitigate the emergency, etc. The emergency response data may also be generated based on mobility/usability criteria to identify more readily available resources (e.g., water contained in a firetruck is preferable over water contained in a tanker). The response data associated with the emergency may include population information (derived from census or current population like cell phone density or electricity usage etc.) for estimated number effected. It will be understood that some embodiments may only receive emergency response data from one or more of the response data sources 128.

In some embodiments, the emergency data sources 126 may be separate from the response data sources 128. In some embodiments, the emergency data sources 126 may overlap (e.g., include some of the same devices, web sites and applications) with the response data sources 128. In some embodiments, the emergency data sources 126 may be the same was the response data sources 128.

The server 102 may receive and analyze the emergency condition data and the emergency response data to predict emergency scenario evolutions, ascertain a current emergency response and augment the current response to address the predicted emergency scenario evolutions through intelligent and advanced resource deployment. In detail, the server 102 may include a performance metrics analyzer 104. The performance metrics analyzer 104 may generate and store performance metrics associated with the emergency and response data sources 126, 128. The performance metrics may represent data associated with reliability of the emergency and response data sources 126, 128.

For example, the performance metrics analyzer 104 may analyze a first device of the emergency data sources 126 over a period of time. The first device may provide data over the period of time that is verifiable. For example, if the first device provides first sensor readings (e.g., temperature related sensor readings), the first sensor readings may be verified to determine whether the sensor readings were accurate. As a more detailed explanation, if the first device provides the first sensor readings (e.g., measurements of the temperature) over the period of time that contradict (e.g., do not match and/or are outside of a predetermined range) sensor readings (e.g., measurements of the temperature) from a plurality of other devices, websites and/or applications of the emergency data sources 126 over the period of time, the first sensor readings may be considered faulty or inaccurate readings of the environment. The performance metrics analyzer 104 may update the performance metric of the first device to include an indication that the first sensor readings are inaccurate.

Suppose however that the first device provides second sensor readings (e.g., pressure related sensor readings) over the period of time that align (e.g., do match and/or are within a predetermined range) with sensor readings (e.g., pressure related sensor readings) from a plurality of other devices, web sites and/or applications of the emergency data sources 126 over the period of time, the second sensor readings may be considered reliable or an accurate measurement of the environment. The performance metrics analyzer 104 may update the performance metric of the first device to include an indication that the second sensor readings are inaccurate.

Thus, the performance metrics analyzer 104 may generate performance factors of the emergency and response data sources 126, 128 based on historical accuracy of the emergency and response data sources 126, 128. While the first and second sensor readings may be compared to other sensor readings from the pluralities of other devices websites and/or applications above, it will be understood that the first and second sensor readings may be compared to ground truths to establish whether the first and second sensor readings are accurate.

Performance metrics may also be generated based on other factors. Continuing with the above example, the performance metric for the first device may be generated based on one or more of historical accuracy of the first device (as measured against ground truths and/or other devices), hardware of the first device, firmware of the first device, spatial proximity of the first device to the current emergency or whether the first device directly measures a condition associated with the current emergency. For example, the performance metric of the first device may include the hardware of the first device, firmware of the first device, spatial proximity of the first device to the current emergency or whether the first device directly measures a condition associated with the current emergency.

Thus, accuracy associated data of the emergency data sources 126 may be stored as first performance metrics. Each of the emergency data sources 126 may be associated with at least one respective performance metric from the first performance metric that corresponds to accuracy and/or performance of the associated device, website or application. For example, the first device (described above) may have a unique performance metric, a second device may have a unique performance metric, etc.

The performance metrics analyzer 104 may generate second performance metrics that correspond to accuracy of the response data sources 128. For example, suppose that the first device is also a part of the response data sources 128. The performance metrics analyzer 104 may identify an accuracy of emergency response data provided by the first device over the period of time. For example, the emergency response data may be verified against emergency response data from other response data sources 128, and/or against ground truths established by emergency personnel. That is, accuracy of each of the response data sources 128 may be stored as part of second performance metrics. Further, the performance metrics analyzer 104 may consider factors, such as hardware of the first device, firmware of the first device, spatial proximity of the first device to the response and whether the first device directly measures a condition associated with the response to generate a performance factor associated with response data for the first device.

The accuracy of the response data sources 128 may be stored as second performance metrics. Each of the response data sources 128 may be associated with a respective performance metric from the second performance metric that corresponds to accuracy and/or performance of the associated device, website or application. In some embodiments, the first performance metrics are the same as or similar to the second performance metrics.

Thus, in some embodiments, the performance metrics analyzer 104 may establish a historical accuracy record for each of the emergency and response data sources 126, 128 based on the above process. The historical accuracy record may further include an indication of time and/or number of sensor samples that each of the emergency and response data sources 126, 128 has been tracked to ascertain the accuracy of the respective device, website or application. The historical accuracy record may be part of the first and second performance metrics.

In some embodiments, the performance metrics analyzer 104 may filter data of the emergency condition and response data if the first and second performance metrics are below a threshold. Doing so may reduce computational resources that are needed for further analysis at an early juncture in the process. In some embodiments, if the corresponding device of the emergency and response data sources 126, 128 has a performance metric that is below a threshold, the corresponding device may be removed and/or blocked by the server 102 to avoid or reduce further communications from the corresponding device. Thus, further resources may be avoided to reduce poor quality data.

The performance metrics analyzer 104 may provide first performance metrics 116 to the emergency analyzer 106 and provide second performance metrics 118 to the response analyzer 108. The emergency analyzer 106 may include an artificial intelligence (AI) 106a and a historical database 106b. The AI analyzer 106a may track a current emergency and generate future scenarios of the current emergency. In detail, the AI analyzer 106a may generate weights (e.g., reliability weightings) to evaluate the emergency condition data from the emergency data sources 126. The weights may be generated based on the first performance metrics.

For example, suppose that first emergency condition data from the emergency condition data originates from a first device from the emergency data sources 126. The AI analyzer 106a may identify a performance metric of the first performance metrics that corresponds to the first device, and generate (e.g., using an algorithm) a weight based on the identified performance metric. The AI analyzer 106a may then apply the weight to the first emergency condition data. For example, the weight may be increased if hardware of the first device is state-of-the-art or relatively new, intact and fully functioning. The weight may also be increased if firmware of the first device is up to date. The weight may also be increased if the first device is proximate to the current emergency (e.g., is close enough the current emergency to accurately measure and/or identify characteristics the current emergency). The weight may also be increased if the first device directly measures and/or identifies a condition associated with current emergency rather than indirectly measuring and/or identifying (or receiving and relaying measurements from another device). For example, if the first device obtains images and derives measurements from the images (e.g., temperature reading from another device in the image, rain fall, accumulated water, etc.), such measurements may be considered to be indirect in that the measurements are not directly measured or directly produced by the first device.

In some embodiments, the AI analyzer 106a may further identify the historical accuracy record of the first device. The weight may be adjusted based on a length of time and/or number of sensor samples that the first device has been evaluated for accuracy. For example, if the first device has only five sensor samples that have verified for accuracy and/or for a short period of time, the weight may be reduced to reflect the relative unknown nature of the first device. Thus, if the first device has been analyzed for accuracy under a certain time threshold and/or under a number of sensor sample threshold, the weight of the first device may be reduced.

In some embodiments, the AI analyzer 106a may weight the emergency condition data in correspondence to an expected accuracy of the emergency condition data. For example, the AI analyzer 106a may generate weights based on the first performance metrics and apply the first performance metrics to the emergency condition data. Thus, portions of the emergency condition that originate from less accurate devices may have smaller weights applied thereto, while portions of the emergency condition data that originate from more accurate devices may have larger weights applied there.

Thus, the AI analyzer 106a may generate scenarios based on more accurate portions of the emergency condition data (highly weighted emergency condition data) while minimizing the influence that less accurate portions of the emergency condition data (low weighted emergency condition data). Each of the emergency condition data may have a weight applied thereto corresponding to an originating device, web site or application of the emergency condition data.

The AI analyzer 106a may access the historical database 106b. The historical database 106b may include previous emergency evolutions that were tracked and monitored. The AI analyzer 106a may compare the weighted emergency data to evolutions of emergencies in the historical database 106b to determine likely evolutions (e.g., future scenarios) of the current emergency. For example, the AI analyzer 106a may determine that the current emergency is similar to a previous emergency stored in the historical database 106b and therefore, the current emergency may progress in a similar fashion to the previous emergency. The progression of the previous emergency may be stored in the historical database 106b and used to predict how the current emergency will progress.

In some embodiments, the AI analyzer 106a may analyze the previous emergency evolutions to extrapolate outputs (e.g., future scenarios that identify how the emergencies may progress) based on inputs (e.g., temperature, geography, rain fall, humidity, time of day, season, etc.). The AI analyzer 106a may use the weighted emergency condition data of the current emergency as the inputs and generate a series of outputs (e.g., future scenarios) of the current emergency. The current scenario, future scenario progression and any other data calculated by the emergency analyzer 106 may be provided as threat analysis 120 to the resource controller 110.

Similarly, the response analyzer 108 may receive the second performance metrics 118. The second performance metrics may correspond to an accuracy of the emergency response data. The AI analyzer 108a may generate weights (e.g., reliability weights) based on the second performance metrics and/or data from the historical database 108b. For example, in some embodiments, the AI analyzer 108a may weight the emergency response data in correspondence to an expected accuracy of the emergency response data by generating weights based on the second performance metrics and applying the second performance metrics to the emergency response data. Thus, portions of the emergency response that originate from less accurate devices may have smaller weights applied thereto, while portions of the emergency response data that originate from more accurate devices may have larger weights applied there. Each of the emergency response data may have a weight applied thereto corresponding to an originating device, website or application of the emergency response data. The weights may be determined similar to above and as described with respect to the weights of the AI analyzer 106a. Similar descriptions are omitted for brevity.

Thus, the AI analyzer 108a may determine a response analysis based on more accurate portions of the emergency response data (highly weighted emergency response data) while minimizing the influence that less accurate portions of the emergency response data (low weighted emergency response data). The response analyzer 108 may transmit the response analysis 122 to the resource controller 110.

The resource controller 110 may receive the threat analysis and the response analysis. The resource controller 110 may determine whether additional resources are needed, and entities that may provide the additional resources. The resource controller 110 may include a historical resource database 110a. The historical resource database 110a may include an identification of resources that were effectively applied to mitigate previous emergencies. For example, the historical resource database 110a may include an indication that certain types of emergency vehicles (e.g., snow trucks) were most effective at certain positions (e.g., highly trafficked roadways and highways) at a certain time (e.g., 1 hour before predicted snowfall).

The resource controller 110 may determine the future scenarios from the threat analysis. The resource controller 110 may compare the future scenarios to the historical resource database 110a. The historical resource database 110a may include historical solutions (e.g., mitigation resources) that effectively mitigated past scenarios that are similar to the future scenarios.

The resource controller 110 may determine the current response from the response analysis. The resource controller 110 may further compare the mitigation resources to the current response (e.g., a current resource distribution). The resource controller 110 may then determine whether additional resources are needed by comparing the current resource distribution to the mitigation resources (e.g., the resources that are predicted to mitigate the emergency).

In this particular example, the resource controller 110 determines that additional resources are needed. For example, the current resource distribution may lack some of the mitigation resources.

Therefore, the resource controller 110 may request an entity to provide the resource 130. In particular, the resource controller 110 may request that the first entity 132 provides additional resources. The server 102 may be directly connected with the first entity 132. For example, the server 102 and the first entity 132 may be part of a same organization (e.g., government).

The resource controller 110 may determine that the first entity 132 is unable to provide all of the additional resources. Thus, the resource controller 110 accesses third-party platforms to request additional assistance 142. The third-party platforms 140 may be part of a different organization (e.g., a private company web site, private company interface and/or private company platform) than the server 102 (e.g., a government entity). The third-party platforms 140 may facilitate communication between the server 102 and the second entity 134, the third entity 136 and the fourth entity 138. For example, the resource controller 110 may not be directly aware of the second-fourth entities 134, 136, 138. Rather, the resource controller 110 may access the third-party platforms 140 which in turn locate and connect the resource controller 110 with the second-fourth entities 134, 136, 138.

In some embodiments, prior to requesting additional resources from the first-fourth entities 132, 134, 136, 138, a user (e.g., an authorized individual) may approve of the request. In some embodiments, the server 102 may automatically execute the requests in response to a threat analysis indicating that a severity of the emergency is above a threshold (e.g., emergency will present life-threatening conditions unless the additional resources are provided to mitigate the emergency).

It will be further understood that each of the emergency and response data sources 126, 128 may send a different communication to the server 102 that includes condition and/or response data. It will be further understood that in some cases the server 102 may provide and receive transmissions to retrieve the condition and/or response data through for example accessing the MaaS devices, IoT devices, websites and/or applications. Further, the MaaS and/or IoT devices may be distributed throughout a region to measure conditions of the emergency (e.g., weather conditions) and also a current level of response to the emergency (e.g., number of snow plows dispatched).

As described above, the server 102 may utilize machine learning algorithms to tie trends of emergency scope response and parameters of the emergency itself (e.g., sub-zero temperatures for several days with extensive snowfall) together to predict a size of the needed response along with characteristics of the response (e.g., number of plows and other aspects such as increased likelihood of fires etc.) For example, some embodiments may include using Machine Learning/AI to anticipate when more vehicles would be needed, routes to place those vehicles (e.g., shift vehicles to the emergency areas earlier with routes that drive closer to where an emergency is occurring) in case they need to be re-routed.

Thus, some embodiments may allow for the server 102 to utilize private parcel sharing to quickly distribute and/or deploy emergency response resources (e.g., salt, water, shovels, sandbag) that may otherwise be outside of a normal supply chain for such materials. The server 102 may also automatically schedule such distributions and deployments through existing first-fourth entities 132, 134, 136, 138. In such a fashion, the server 102 may utilize different response mechanisms to enhance an overall response.

Figure 2:
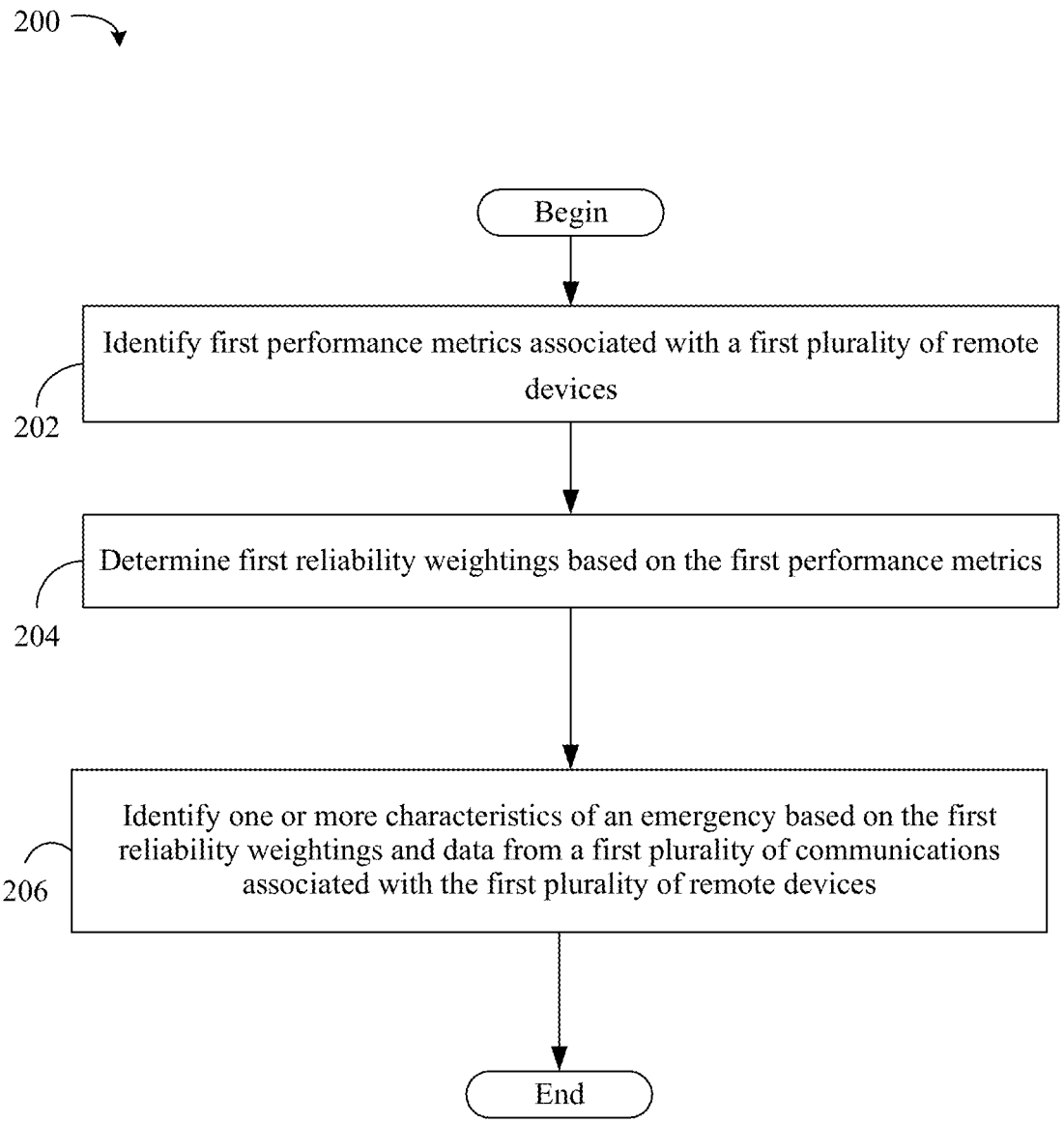
FIG. 2 is a flowchart of an example of a method of identifying characteristics of an emergency according to an embodiment.

FIG. 2 shows a method 200 of identifying characteristics of an emergency. The method 200 may generally be implemented in conjunction with any of the embodiments described herein, for example the system 100 of FIG. 1. In an embodiment, the method 200 is implemented in logic instructions (e.g., software), configurable logic, fixed-functionality hardware logic, circuitry, etc., or any combination thereof.

Illustrated processing block 202 identifies first performance metrics associated with a first plurality of remote devices. The first plurality of remote devices may be IoT devices and/or MaaS devices. Illustrated processing block 204 determines first reliability weightings based on the first performance metrics. Illustrated processing block 206 identifies one or more characteristics of an emergency based on the first reliability weightings and data from a first plurality of communications associated with the first plurality of remote devices.

Figure 3:
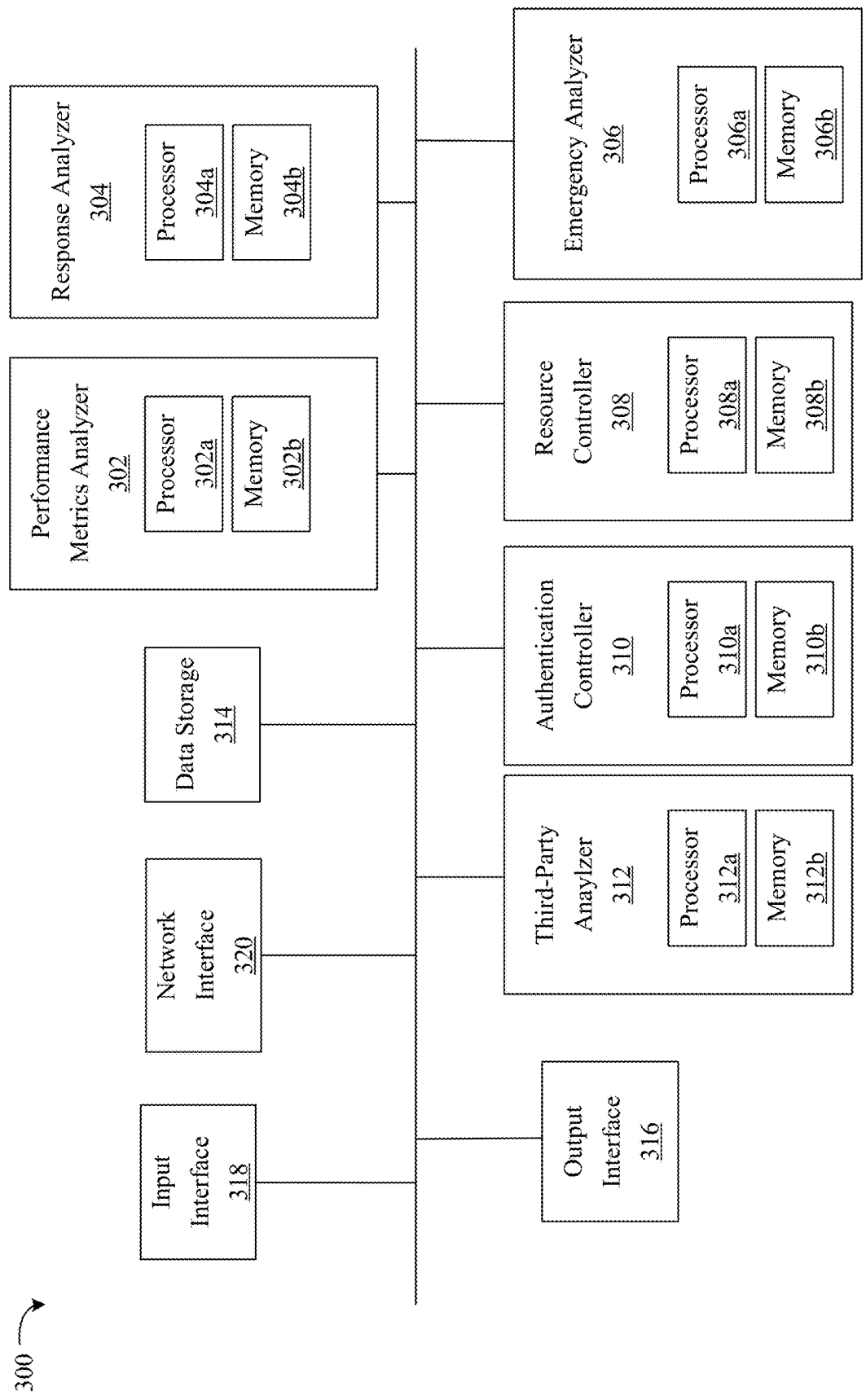
FIG. 3 is a block diagram of an example of a control sub-system according to an embodiment.

FIG. 3 shows a more detailed example of a system 300 (e.g., a computing platform and/or computing device) to predict emergency scenarios, current response to an emergency and allocate resources. The illustrated system 300 may be readily implemented in the server 102 to execute system 100 (FIG. 1) and may implement the method 200 (FIG. 2), already discussed.

In the illustrated example, the system 300 may include a network interface 320. The network interface 320 may allow for communications between the server 102 and websites, entities, MaaS devices, IoT devices and so forth to transmit messages over the internet or other mediums. The network interface 320 may operate over various wireless communications. The network interface 320 may be distributed across several computing devices and/or computing platforms.

The system 300 may include a data storage 314 to store historical databases of emergencies. The data storage 314 may further store resource allocations that mitigated the emergencies. The data storage 314 may be implemented in non-volatile storage such as Flash memory, hard disk drive, solid state drive, and/or volatile memory such as random-access memory.

The system 300 may further include an output interface 316. For example, the output interface 316 may interface with an audio output and/or display to provide a user with notifications about a current emergency, future scenarios of the current emergency, a current response to the current emergency, whether additional resources are recommended to be obtained, additional entities that may provide the additional resources and/or whether the additional resources are available. A user may acknowledge or provide authorization to obtain additional resources through the input interface 318. The input interface 318 may interface with inputs controlled by the user.

The system 300 may include a performance metrics analyzer 302 to analyze performance of data sources (e.g., MaaS devices, IoT devices, websites, applications, etc.) that provide data associated with the response and/or current emergency to the system 300. The performance metrics analyzer 302 may generate performance metrics based on the analyzed performance. Additionally, the performance metrics analyzer 302 may include a processor 302a (e.g., embedded controller, central processing unit/CPU, circuitry, etc.) and a memory 302b (e.g., non-volatile memory/NVM and/or volatile memory) containing a set of instructions, which when executed by the processor 302a, cause the performance metrics analyzer 302 to generate performance metrics as described herein.

The system 300 may include a response analyzer 304 to analyze response data indicative of a response to the current emergency. The response data may be received from data sources. The response analyzer 304 may generate weights based on the performance metrics and apply the weights to the response data to generate a current level of response. Additionally, the response analyzer 304 may include a processor 304a (e.g., embedded controller, central processing unit/CPU, circuitry, etc.) and a memory 304b (e.g., non-volatile memory/NVM and/or volatile memory) containing a set of instructions, which when executed by the processor 304a, cause the response analyzer 304 to generate the current level of response as described herein.

The system 300 may include an emergency analyzer 306 to analyze emergency data indicative of the current emergency. The emergency data may be received from data sources. The emergency analyzer 306 may generate weights based on the performance metrics and apply the weights to the emergency data to generate a current threat level of the emergency and future progressions of the current emergency. Additionally, the emergency analyzer 306 may include a processor 306a (e.g., embedded controller, central processing unit/CPU, circuitry, etc.) and a memory 306b (e.g., non-volatile memory/NVM and/or volatile memory) containing a set of instructions, which when executed by the processor 306a, cause the emergency analyzer 306 to generate the current threat level and future progressions as described herein.

The system 300 may include a third-party analyzer 312 to analyze third party entities that provide resources. The third-party analyzer 312 may analyze the third-party entities to determine cheapest, safest and efficient entities that provide resources. Additionally, the third-party analyzer 312 may include a processor 312a (e.g., embedded controller, central processing unit/CPU, circuitry, etc.) and a memory 312b (e.g., non-volatile memory/NVM and/or volatile memory) containing a set of instructions, which when executed by the processor 312a, cause the third-party analyzer 312 to analyze third-party entities.

The system 300 may include a resource controller 308 to allocate resources based on the future progressions and the current response. The resource controller 308 may access data storage 314 to determine resource allocations that mitigated previous emergencies (e.g., emergencies that are similar to the future progressions) and distribute resources according to the resource allocations. The resource controller 308 may cause the third-party analyzer 312 to request additional entities to provide the resources. Additionally, the resource controller 308 may include a processor 308a (e.g., embedded controller, central processing unit/CPU, circuitry, etc.) and a memory 308b (e.g., non-volatile memory/NVM and/or volatile memory) containing a set of instructions, which when executed by the processor 308a, cause the resource controller 308 to allocate resources and allocate entities to provide the resources as described herein.

The system 300 may include an authentication controller 310 to authenticate a user. For example, prior to requesting additional resources from third-party entities, the authentication controller 310 may authenticate (e.g., biometric, password based, etc.) a user who authorizes the request. Additionally, the authentication controller 310 may include a processor 310a (e.g., embedded controller, central processing unit/CPU, circuitry, etc.) and a memory 310b (e.g., non-volatile memory/NVM and/or volatile memory) containing a set of instructions, which when executed by the processor 310a, cause the authentication controller 310 to authenticate a user as described herein.

One or more aspects of the system 300 may correspond to a control sub-system. For example, one or more of the performance metrics analyzer 302, the response analyzer 304, the emergency analyzer 306, the resource controller 308, the authentication controller 310, the third-party analyzer 312, the output interface 316, the input interface 318 or the data storage 314 may correspond to the control sub-system.

Figure 4:
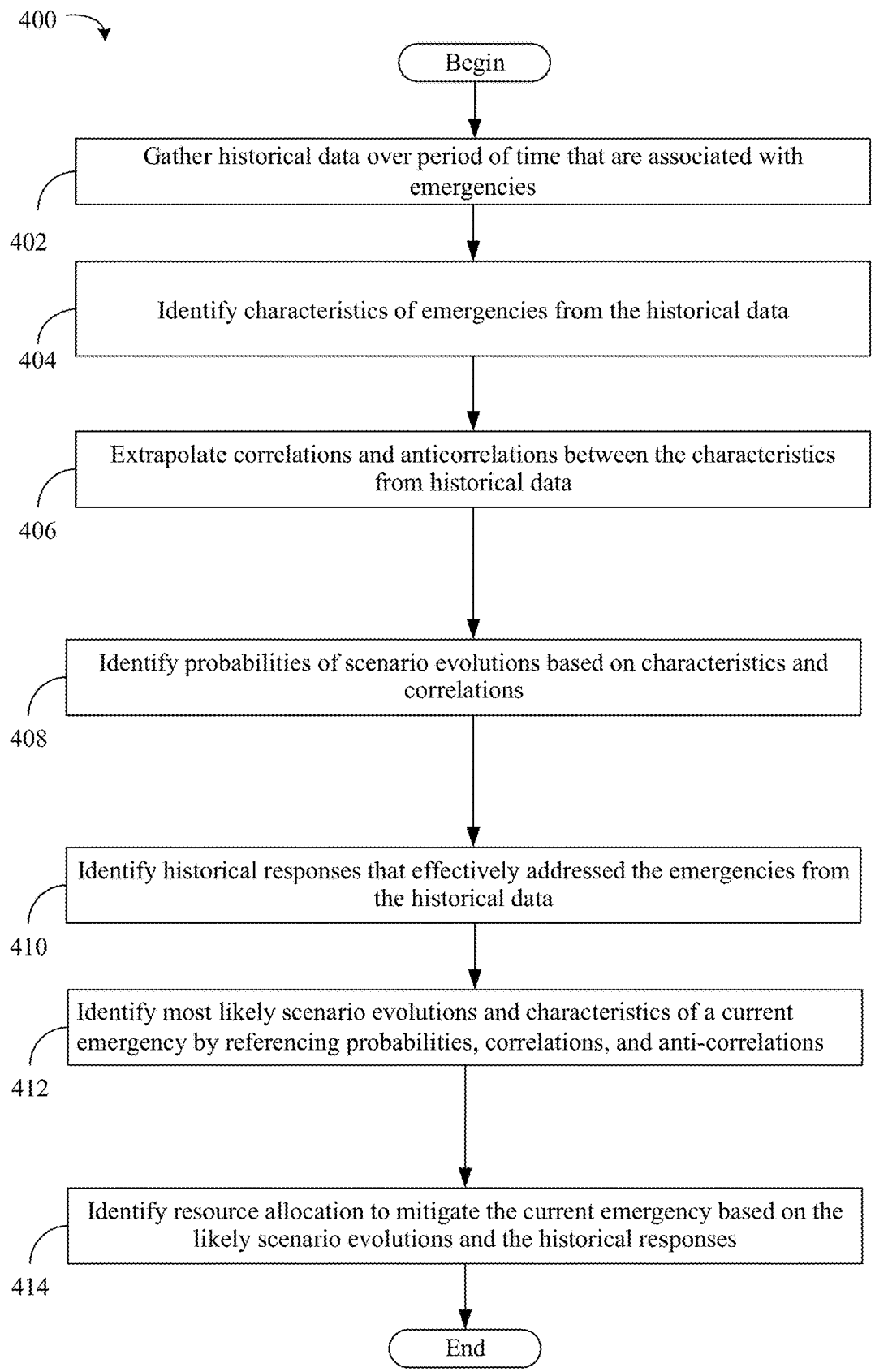
FIG. 4 is a flowchart of an example of a method of generating and utilizing a historical database according to an embodiment.

FIG. 4 shows a method 400 of generating and utilizing a historical database identifying emergencies and responses to the emergencies. The method 400 may generally be implemented in conjunction with any of the embodiments described herein. For example, the method 400 may be readily implemented in conjunction with server 102 of FIG. 1, the method 200 of FIG. 2 and the system 300 of FIG. 3. In an embodiment, the method 400 is implemented in logic instructions (e.g., software), configurable logic, fixed-functionality hardware logic, circuitry, etc., or any combination thereof.

Illustrated processing block 402 gathers historical data over a period of time that are associated with emergencies.

Illustrated processing block 404 identifies characteristics of the emergencies (e.g., temperature, snowfall, rainfall, wind, pressure, geography of area affected by emergency, geographic size of the emergency).

Illustrated processing block 406 extrapolates correlations and anticorrelations between the characteristics from the historical data. For example, a characteristic of a drought may correlate to a high temperature. In contrast, a characteristic of snowfall may correlate to a low temperature (e.g., not a high temperature). Thus, some characteristics may be inferred based on other characteristics.

Illustrated processing block 408 identifies probabilities of scenario evolutions based on characteristics and correlations. For example, illustrated processing block 408 may utilize artificial intelligence to map predictive models and provide probabilities of those predictive models occurring based on various inputs (e.g., characteristics of a current emergency).

Illustrated processing block 410 identifies historical responses that effectively addressed the emergencies from the historical data. For example, illustrated processing block 410 may determine that a first allocation of resources (e.g., number and position of snow plows) mitigated a first emergency (e.g., snow storm), while a second allocation of resources (e.g., number and position of firetrucks) effectively mitigated a second emergency (e.g., a wild fire).

Illustrated processing block 412 identifies most likely scenario evolutions and characteristics of a current emergency by referencing probabilities, correlations, and anticorrelations. As noted, characteristics that are unable to be actually measured or identified with MaaS and/or IoT devices may be derived from other measured and/or identified characteristics based on the correlations and anticorrelations. The derived and measured characteristics may be utilized as inputs in an artificial intelligence algorithm to identify most likely scenario evolutions.

Illustrated processing block 414 identifies a resource allocation to mitigate the current emergency based on the likely scenario evolutions and the historical responses. The resource allocation may be determined based on previous resource allocations (identified in this historical responses) that mitigated emergencies similar to the likely scenario evolutions. For example, the likely scenario evolutions may be compared to the historical emergencies. Historical emergencies that are similar to the likely scenario evolutions may be identified. Resource allocations that mitigated the identified historical emergencies may be identified and utilized as resource allocations to address the current emergency.

Figure 5:
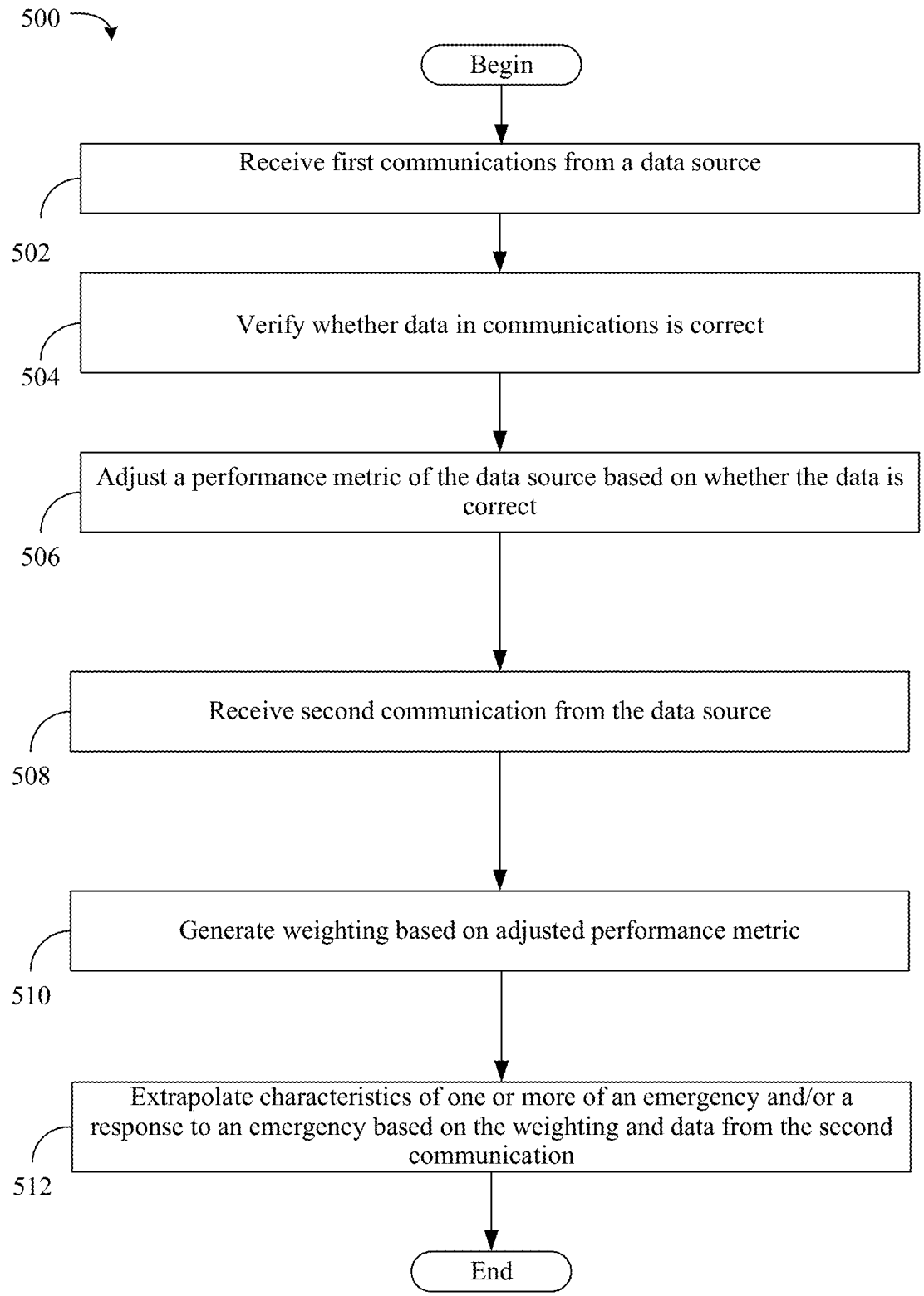
FIG. 5 is a flowchart of an example of a method of generating and utilizing performance metrics based on historical records according to an embodiment.

FIG. 5 shows a method 500 of generating performance metrics based on historical records and utilizing the performance metrics. The method 500 may generally be implemented in conjunction with any of the embodiments described herein. For example, the method 500 may be readily implemented in conjunction with the server 102 of FIG. 1, the method 200 of FIG. 2, the system 300 of FIG. 3 and/or the method 400 of FIG. 4. In an embodiment, the method 500 is implemented in logic instructions (e.g., software), configurable logic, fixed-functionality hardware logic, circuitry, etc., or any combination thereof.

Illustrated processing block 502 receives a first communication from a data source (e.g., a MaaS device, an IoT device, website, application).

Illustrated processing block 504 verifies whether data in the communication is correct. For example, illustrated processing block 504 may reference a ground truth and/or data provided by other devices to ascertain the correctness.

Illustrated processing block 506 adjusts a performance metric of the data source based on whether the data is correct. For example, the performance metric may reflect whether the data is correct or incorrect.

Illustrated processing block 508 receives a second communication from the data source.

Illustrated processing block 510 generates a weighting based on the adjusted performance metric.

Illustrated processing block 512 extrapolates characteristics of one or more of an emergency and/or a response to an emergency based on the weighting and data from the second communication. For example, the weighting may be applied to the data from the second communication to determine the characteristics of the emergency and/or the response.

Figure 6:
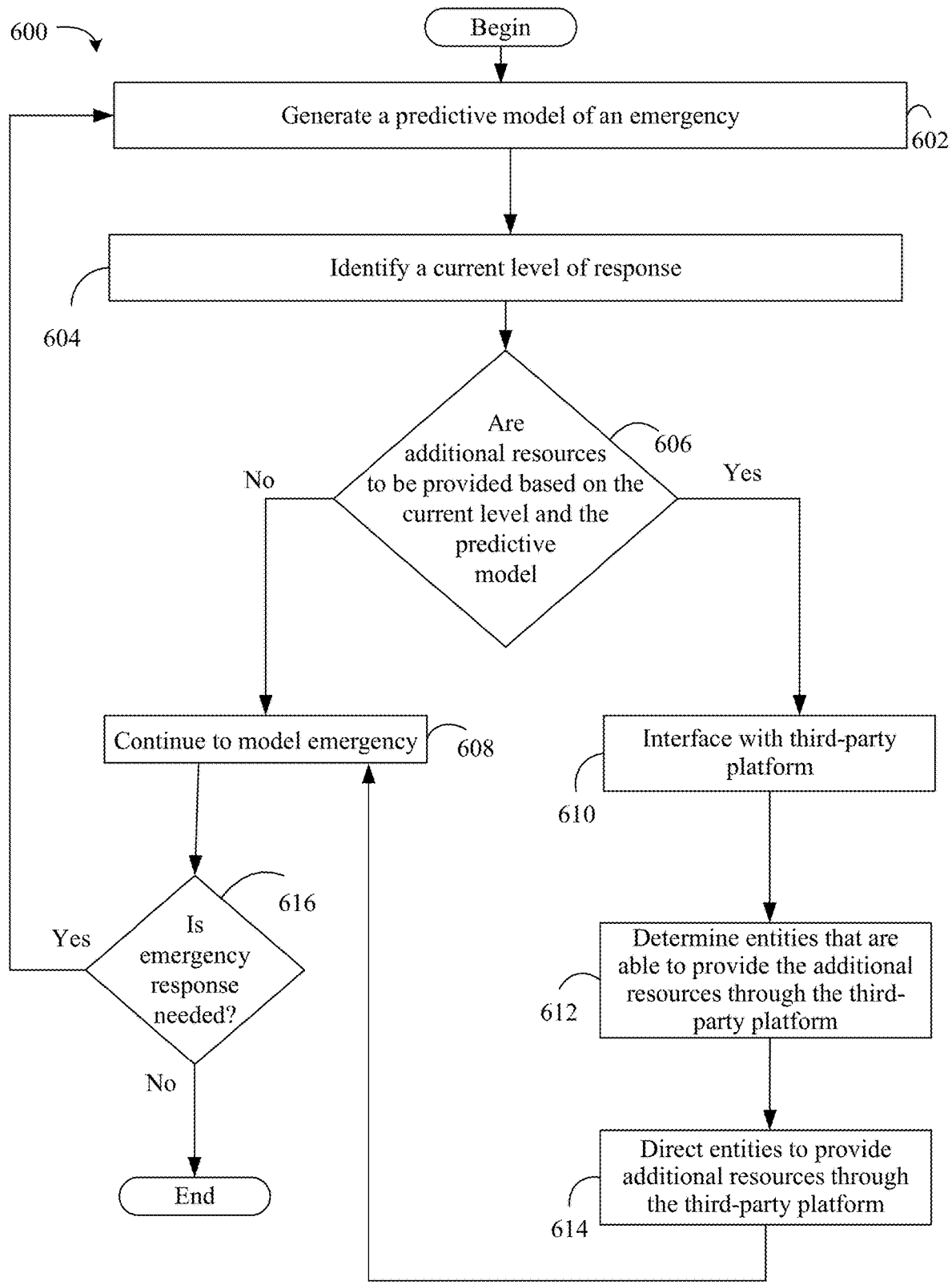
FIG. 6 is a flowchart of an example of a method of allocating entities to provide resources based on predictive models of an emergency according to an embodiment.

FIG. 6 shows a method 600 of allocating entities to provide resources based on predictive models of an emergency. The method 600 may generally be implemented in conjunction with any of the embodiments described herein. For example, the method 600 may be readily implemented in conjunction with the server 102 of FIG. 1, the method 200 of FIG. 2, the system 300 of FIG. 3, the method 400 of FIG. 4 and/or the method 500 of FIG. 5. In an embodiment, the method 500 is implemented in logic instructions (e.g., software), configurable logic, fixed-functionality hardware logic, circuitry, etc., or any combination thereof.

Illustrated processing block 602 generates a predictive model of an emergency.

Illustrated processing block 604 identifies a current level of a response.

Illustrated processing block 606 determines if additional resources are to be provided based on the current level and the predictive model. For example, if the current level of response may not effectively mitigate some aspects of the emergency, illustrated processing block 606 may determine that the additional resources are to be provided. Otherwise, illustrated processing block 608 continues to model the emergency. illustrated processing block 616 determines whether an emergency response is needed. To conserve resources, a system that implements the method 600 may stop modeling the emergency when it is deemed that no emergency response is needed (e.g., emergency is over or reached a point where services are no longer needed). For example, the system may use predictive modeling to predict that the emergency is concluded and no more emergency response is therefore needed. If the emergency response is needed, illustrated processing block 602 may execute. Otherwise, the method 600 may end.

If illustrated processing block 608 determines that additional resources are to be provided, illustrated processing block 610 interfaces with a third-party platform (e.g., websites, applications, etc.).

Illustrated processing block 612 determines, through the third-party platform, entities that are able to provide the additional resources.

Illustrated processing block 614 directs entities to provide additional resources through the third-party platform.

Figure 7:
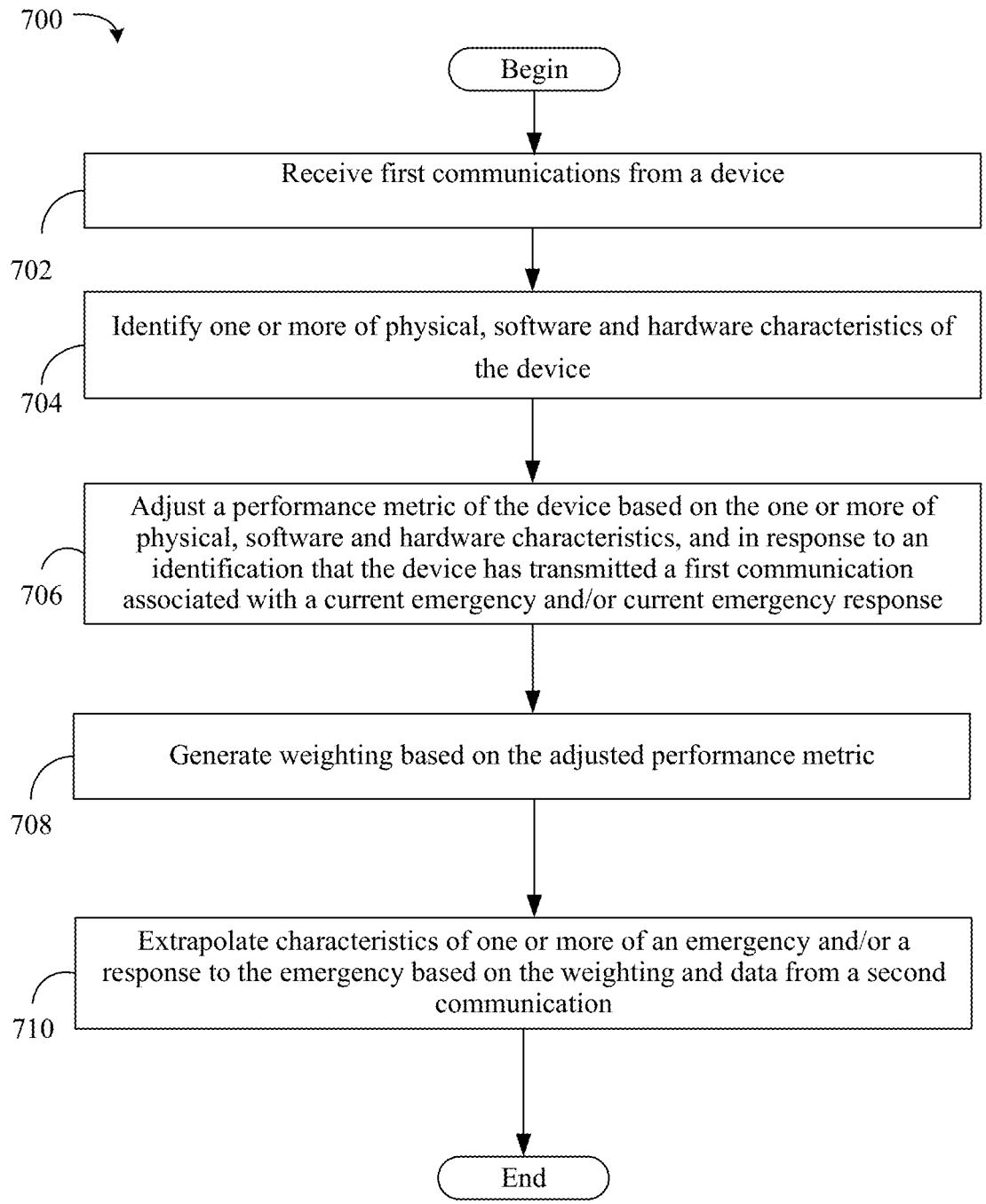
FIG. 7 is a flowchart of an example of a method of adjusting and utilizing performance metrics of a device based on characteristics of the device according to an embodiment.

FIG. 7 shows a method 700 of adjusting performance metrics of a device based on characteristics of the device and utilizing the performance metrics. The method 700 may generally be implemented in conjunction with any of the embodiments described herein. For example, the method 700 may be readily implemented in conjunction with the server 102 of FIG. 1, the method 200 of FIG. 2, the system 300 of FIG. 3, the method 400 of FIG. 4, the method 500 of FIG. 5 and/or the method 600 of FIG. 6. In an embodiment, the method 700 is implemented in logic instructions (e.g., software), configurable logic, fixed-functionality hardware logic, circuitry, etc., or any combination thereof.

Illustrated processing block 702 receives a first communications from a device. The first communication may be associated with a current emergency and/or current emergency response. Illustrated processing block 704 identifies one or more of physical, software and hardware characteristics of the device. The one or more of physical, software and hardware characteristics may include one or more of hardware of the first device, firmware of the first device, spatial proximity of the first device to the current emergency and/or response or whether the first device directly measures a condition associated with the current emergency and/or response.

Illustrated processing block 706 adjusts a performance metric of the device based on the one or more of physical, software and hardware characteristics noted above, and in response to an identification that the device has transmitted a first communication associated with a current emergency and/or current emergency response. For example, an accuracy of the device may be represented by the performance metric. If the firmware is out-of-date, the performance metric may be adjusted to lower the accuracy of the device. If the hardware of the device is of-date, the performance metric may be adjusted to lower the accuracy of the device. If the device does not directly measure and/or identify conditions of the emergency and/or response (e.g., relays measurements on and/or derives conditions from sensor readings), the performance metric may be adjusted to lower the accuracy of the device. Further, if the first device is disposed outside an area of the emergency and/or response, the performance metric may be adjusted to lower the accuracy of the device.

Illustrated processing block 708 generates a weighting based on the adjusted performance metric.

Illustrated processing block 710 extrapolates characteristics of one or more of an emergency and/or a response to the emergency based on the weighting and data from a second communication.

Figure 8:
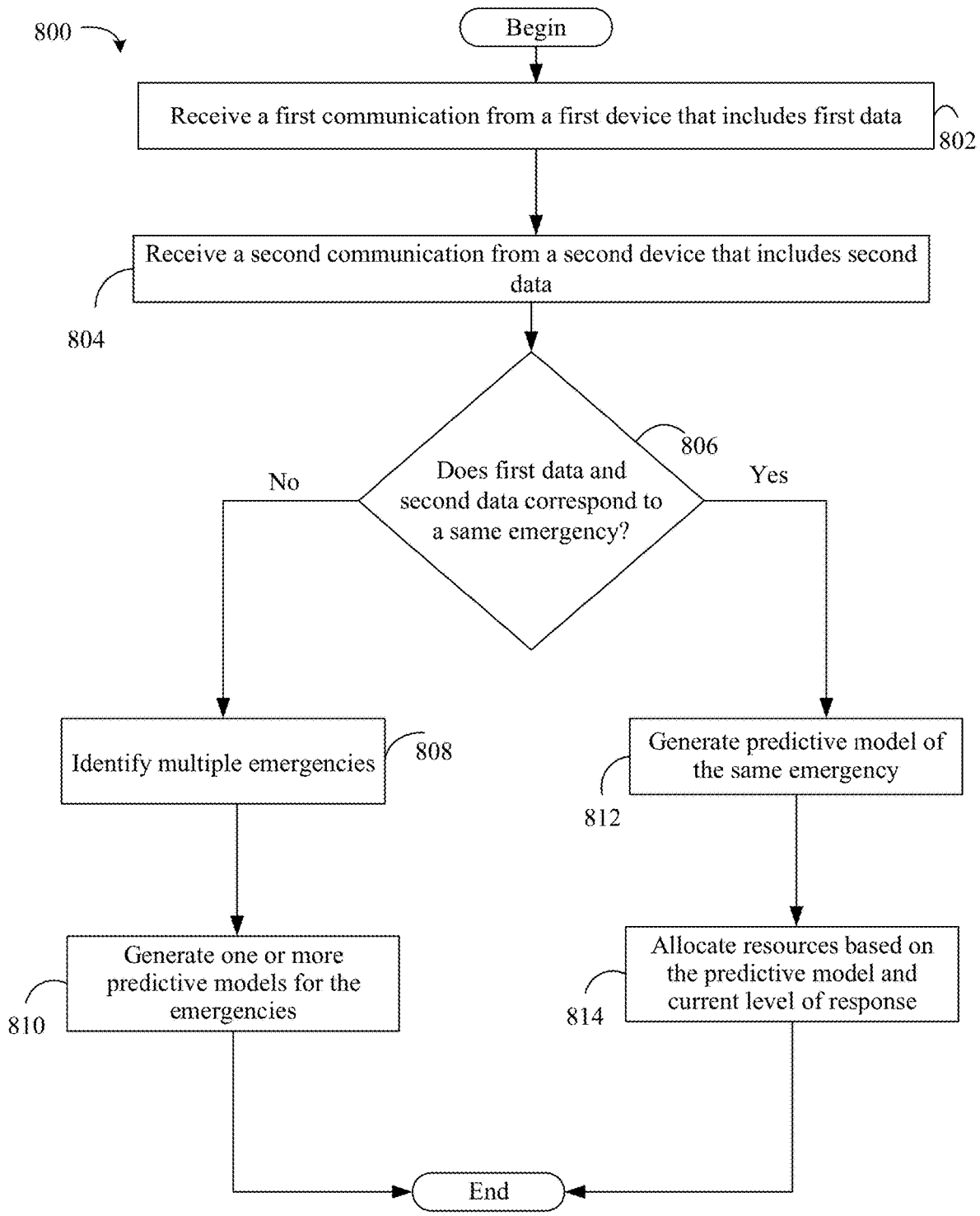
FIG. 8 is a flowchart of an example of a method of identifying and responding to multiple emergencies according to an embodiment.

FIG. 8 shows a method 800 of identifying and responding to multiple emergencies. The method 800 may generally be implemented in conjunction with any of the embodiments described herein. For example, the method 800 may be readily implemented in conjunction with the server 102 of FIG. 1, the method 200 of FIG. 2, the system 300 of FIG. 3, the method 400 of FIG. 4, the method 500 of FIG. 5, the method 600 of FIG. 6 and/or the method 700 of FIG. 7. In an embodiment, the method 800 is implemented in logic instructions (e.g., software), configurable logic, fixed-functionality hardware logic, circuitry, etc., or any combination thereof.

Illustrated processing block 802 receive a first communication from a first device that includes first data.

Illustrated processing block 804 receives a second communication from a second device that includes second data.

Illustrated processing block 806 determines if first data and second data correspond to a same emergency. For example, if the first data is outside of a threshold from the second data, the emergencies may be deemed different.

If the first data and the second data correspond to a same emergency, illustrated processing block 812 generates a predictive model of the same emergency.

Illustrated processing block 814 allocates resources based on the predictive model and a current level of response.

If the first data and the second data do not correspond to a same emergency, illustrated processing block 808 identifies multiple emergencies.

Illustrated processing block 810 generates one or more predictive models for the emergencies. In some embodiments, a single predictive model may model both emergencies concurrently. For example, if the first and second emergencies interact with each other, a single model may be deemed appropriate to model the first and second emergencies.

Figure 9:
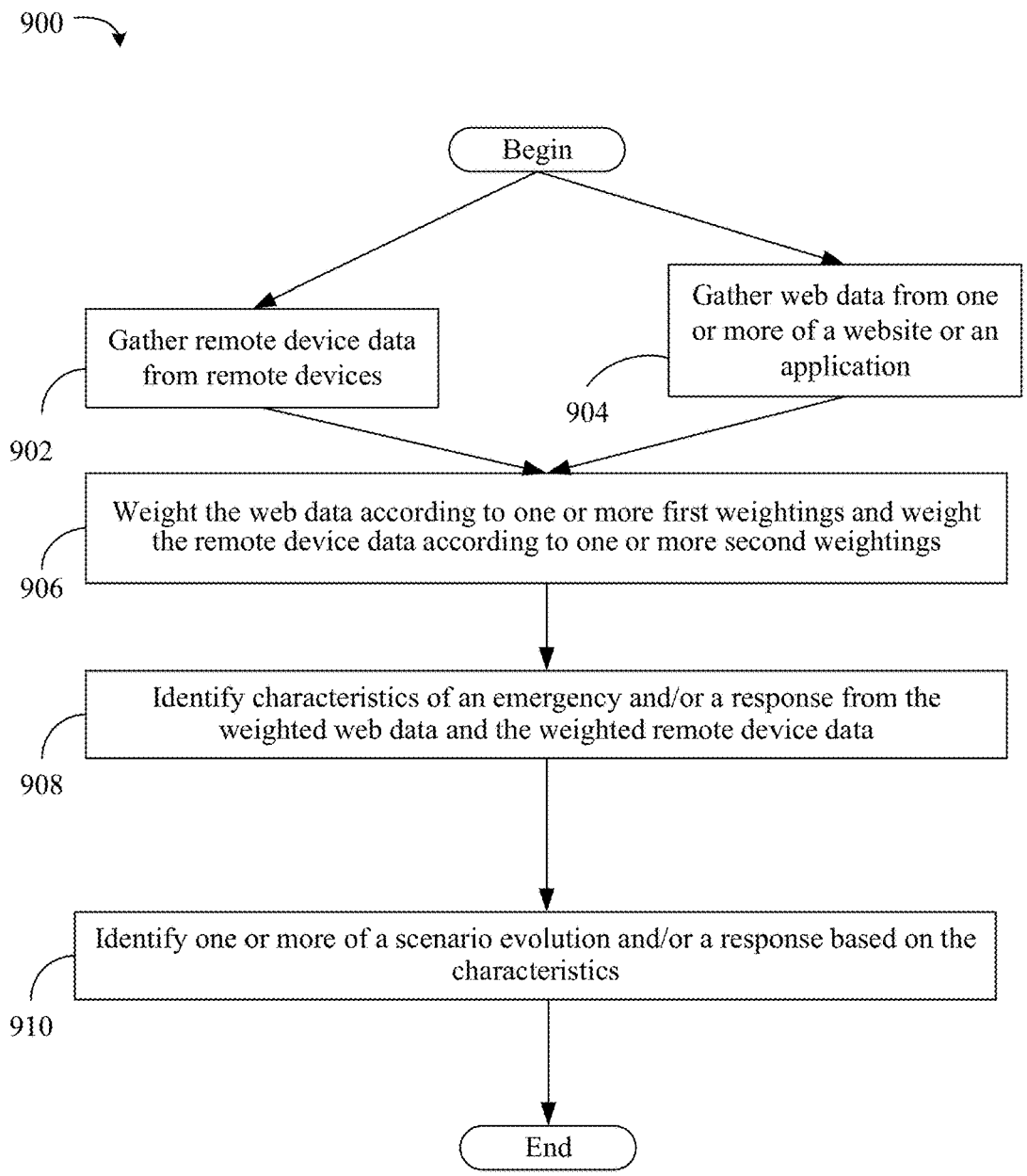
FIG. 9 is a flowchart of an example of a method of identifying scenario evolutions according to data from remote devices and web data according to an embodiment.

FIG. 9 shows a method 900 of identifying scenario evolutions according to data from remote devices and web data. The method 900 may generally be implemented in conjunction with any of the embodiments described herein. For example, the method 800 may be readily implemented in conjunction with the server 102 of FIG. 1, the method 200 of FIG. 2, the system 300 of FIG. 3, the method 400 of FIG. 4, the method 500 of FIG. 5, the method 600 of FIG. 6, the method 700 of FIG. 7 and/or the method 800 of FIG. 8. In an embodiment, the method 900 is implemented in logic instructions (e.g., software), configurable logic, fixed-functionality hardware logic, circuitry, etc., or any combination thereof.

Illustrated processing block 902 gathers remote device data from remote devices.

Illustrated processing block 904 gathers web data from one or more of a website or an application.

Illustrated processing block 906 weights the web data according to one or more first weightings and weights the remote device data according to one or more second weightings. The first weightings may be different from the second weightings.

Illustrated processing block 908 identifies characteristics of an emergency and/or a response from the weighted web data and the weighted remote device data.

Illustrated processing block 910 identifies one or more of a scenario evolution and/or a response based on the characteristics.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A system, comprising:
a network interface, to receive a first plurality of communications associated with a first plurality of remote devices that monitor an environment for an emergent situation; and a control sub-system including at least one processor and at least one memory having a set of instructions, which when executed by the at least one processor, cause the control subsystem to:
identify first performance metrics associated with the first plurality of remote devices, the first performance metrics based on reliability of the first plurality of remote devices; determine first reliability weightings based on the first performance metrics;
identify one or more characteristics of an emergency based on the first weightings and data from the first plurality of communications;
determine at least one first performance metric for a first device of the first plurality of remote devices based on one or more of hardware of the first device or firmware of the first device, the at: least one first performance metric being based on reliability of the first device; and increase the first reliability weightings when at least one of: at least one of the first plurality of remote devices is new; or firmware of the at least one of the first plurality of remote devices is updated.

2. The system of claim 1, wherein:
the network interface receives a second plurality of communications associated with a second plurality of remote devices;
the instructions of the at least one memory, when executed, cause the control sub-system to:
determine second performance metrics associated with the second plurality of remote devices;
determine second reliability weightings based on the second performance metrics; and
identify one or more second characteristics of a response to the emergency based on the second reliability weightings and data from the second plurality of communications.

3. The system of claim 1, wherein the instructions of the at least one memory, when executed, cause the control sub-system to:
determine one or more resources associated with mitigation of the emergency; and
access a third-party platform to identify one or more entities to provide the one or more resources; and
request assistance from the one or more entities through the third-party platforms.

4. The system of claim 1, wherein the instructions of the at least one memory, when executed, cause the control sub-system to:
determine the first performance metrics based on historical accuracy of data provided by the first plurality of remote devices.

5. The system of claim 1, wherein the instructions of the at least one memory, when executed, cause the control sub-system to:
determine a first reliability weighting for the first device based the at least one first performance metric of the first device;
extract first data from a first communication of the first plurality of communications, wherein the first communication originates from the first device;
apply the first reliability weighting to the first data to generate weighted first data; and
identify the one or more characteristics based on the weighted first data.

6. At least one non-transitory computer readable storage medium comprising a set of instructions, which when executed by a computing platform, cause the computing platform: to:
identify first performance metrics associated with a first plurality of remote devices that monitor an environment for an emergent situation, the first performance metrics based on reliability of the first plurality of remote devices;
determine first reliability weightings based on the first performance metrics;
identify one or more characteristics of an emergency based on We first reliability weightings and data from a first plurality of communications associated with the first plurality of remote devices;
determine at least one first performance metric for a first device of the first plurality of remote devices based on one or more of hardware of We first device or firmware of the first device, the at least one first performance metric being based on reliability of the first device; and increase the first reliability weightings when at least one of
at least one of the first plurality of remote devices is new; or firmware of the at least one of the first plurality of re mote devices is updated.

7. The at least one non-transitory computer readable storage medium of claim 6, wherein the instructions, when executed, cause the computing platform to:
identify second performance metrics associated with a second plurality of remote devices;
determine second reliability weightings based on the second performance metrics; and
identify one or more second characteristics of a response to the emergency based on the second reliability weightings and data from a second plurality of communications associated with the second plurality of remote devices.

8. The at least one non-transitory computer readable storage medium of claim 6, wherein the instructions, when executed, cause the computing platform to:
determine one or more resources associated with mitigation of the emergency; and
access a third-party platform to identify one or more entities to provide the one or more resources; and
request assistance from the one or more entities through the third-party platforms.

9. The at least one non-transitory computer readable storage medium of claim 6, wherein the instructions, when executed, cause the computing platform to:
determine the first performance metrics based on historical accuracy of data provided by the first plurality of remote devices.

10. The at least one non-transitory computer readable storage medium of claim 6, wherein the instructions, when executed, cause the computing platform to:
determine a first reliability weighting for the first device based on the at least one first performance metric of the first device;
extract first data from a first communication of the first plurality of communications, wherein the first communication originates from the first device;
apply the first reliability weighting to the first data to generate weighted first data; and identify the one or more characteristics based on the weighted first data.

11. A method comprising:

identifying first performance metrics associated with a first plurality of remote devices that monitor an environment for an emergent situation, the first performance metrics based on reliability of the first plurality of remote devices;

determining first reliability weightings based on the first performance metrics;

identifying one or more characteristics of an emergency based on the first reliability weightings and data from a first plurality of communications associated with the first plurality of remote devices;

determining at least one first performance metric for a first device of the first plurality of remote devices based on one or more of hardware of the first device or firmware of the first device; and increasing the first reliability weightings when at least one of:

at least one of the first plurality of remote devices is substantially new; or firmware of the at least one of the first plurality of remote devices is updated.

12. The method of claim 11, further comprising:

identifying second performance metrics associated with a second plurality of remote devices;

determining second reliability weightings based on the second performance metrics; and identifying one or more second characteristics of a response to the emergency based on the second reliability weightings and data from a second plurality of communications associated with the second plurality of remote devices.

13. The method of claim 11, further comprising:

determining the first performance metrics based on historical accuracy of data provided by the first plurality of remote devices.

14. The method of claim 11, further comprising:

determining a first reliability weighting for the first device based on the at least one first performance metric of the first device;

extracting first data from a first communication of the first plurality of communications, wherein the first communication originates from the first device;

applying the first reliability weighting to the first data to generate weighted first data; and identifying the one or more characteristics based on the weighted first data.

* * * * *